United States Patent
Seo et al.

(10) Patent No.: US 8,285,335 B2
(45) Date of Patent: Oct. 9, 2012

(54) CASE HAVING DISPLAY WINDOW AND MOBILE TERMINAL HAVING THE CASE

(75) Inventors: In Su Seo, Suwon-si (KR); Ju Sik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 12/316,841

(22) Filed: Dec. 17, 2008

(65) Prior Publication Data

US 2009/0163249 A1 Jun. 25, 2009

(30) Foreign Application Priority Data

Dec. 20, 2007 (KR) .............................. 2007-0134572

(51) Int. Cl.
*H04B 1/03* (2006.01)
*H05K 5/00* (2006.01)
(52) U.S. Cl. .......................................... 455/566; 349/64
(58) Field of Classification Search .................. 455/466; 361/814; 174/36; 439/76.1
See application file for complete search history.

(56) References Cited

U.S. PATENT DOCUMENTS

| | | | |
|---|---|---|---|
| 5,005,939 A * | 4/1991 | Arvanitakis et al. ............ | 385/53 |
| 6,290,542 B1 * | 9/2001 | Kuo ......................... | 439/607.49 |
| 6,480,397 B1 * | 11/2002 | Hsu et al. ...................... | 361/814 |
| 6,659,800 B1 * | 12/2003 | Wu ........................... | 439/607.11 |
| 6,692,268 B2 * | 2/2004 | Kung et al. ................... | 439/76.1 |
| 6,771,490 B2 * | 8/2004 | Peker et al. .............. | 361/679.34 |
| 7,071,556 B2 * | 7/2006 | Mu ............................ | 257/738 |
| 2003/0062811 A1 * | 4/2003 | Peker et al. ................ | 312/223.1 |
| 2003/0201114 A1 * | 10/2003 | Beele .......................... | 174/65 R |
| 2005/0109522 A1 * | 5/2005 | Ysbrand ....................... | 174/36 |
| 2006/0055038 A1 * | 3/2006 | Mu ............................. | 257/738 |
| 2006/0202335 A1 * | 9/2006 | Mu ............................. | 257/738 |
| 2009/0163249 A1 * | 6/2009 | Seo et al. ..................... | 455/566 |
| 2010/0103348 A1 * | 4/2010 | Chen ............................ | 349/64 |

* cited by examiner

*Primary Examiner* — William D Cumming

(57) ABSTRACT

A case having a display window and a mobile terminal having the case that suppress damage due to static electricity applied to a display window are provided. The case of a mobile terminal for covering a display device thereof includes: a case body in which a window space for exposing a panel of the display device is formed; and a display window attached to a peripheral edge of the window space and having an EMI protection layer formed around a peripheral edge of the display window. Static electricity applied to the display window of the case is thereby grounded through the EMI protection layer formed in the display window, thus suppressing damage of an external appearance of the display device due to static electricity.

20 Claims, 6 Drawing Sheets

(12) United States Patent
US 8,285,335 B2

CASE HAVING DISPLAY WINDOW AND MOBILE TERMINAL HAVING THE CASE

CROSS-REFERENCE TO RELATED APPLICATION(S) AND CLAIM OF PRIORITY

The present application claims priority to an application entitled "CASE HAVING DISPLAY WINDOW AND MOBILE TERMINAL HAVING THE CASE" filed in the Korean Intellectual Property Office on Dec. 20, 2007 and assigned Serial No. 2007-0134572, the contents of which are incorporated herein by reference.

TECHNICAL FIELD OF THE INVENTION

The present invention relates to a case and a mobile terminal and, more particularly, to a case having a display window and a mobile terminal having the case that reduces damage due to static electricity applied to a display window.

BACKGROUND OF THE INVENTION

As information and communication technology and manufacturing technology of a mobile terminal develop, various forms of mobile terminals that can perform various applications and that are easily carried have been introduced. Mobile terminals are manufactured in various forms of a bar type, a flip type having a cover, a folder type, and a slide type.

In the mobile terminal, due to static electricity applied from the outside while using the terminal, a problem may occur in which a part thereof or a coated layer of a surface thereof is damaged. That is, due to static electricity applied to a display window of a case for covering a panel of a display device of the mobile terminal, a problem may occur that a drive IC (integrated circuit) of the panel is damaged.

Further, when static electricity is applied to a coated layer formed at an outer edge of the display window, an appearance fault such as a black spot may occur in the coated layer at the edge of the display window, thereby damaging an external appearance of the mobile terminal.

SUMMARY OF THE INVENTION

To address the above-discussed deficiencies of the prior art, it is a primary object to provide a case having a display window and a mobile terminal having the case that reduces damage to a drive IC of a display device of the mobile terminal and damage of an external appearance of the mobile terminal due to static electricity applied to the display window of the case.

In accordance with an aspect of the present invention, a case of a mobile terminal for covering a display device thereof includes: a case body in which a window space for exposing a panel of the display device is formed; and a display window attached to a peripheral edge of the window space and having an electromagnetic interference (EMI) protection layer formed around a peripheral edge of the display window.

In accordance with another aspect of the present invention, a mobile terminal includes: a lower case; a display device provided within the lower case so that a panel of the display device faces outward from the lower case; and an upper case coupled to the lower case to cover the display device, the upper case including a case body in which a window space for exposing a panel of the display device is formed; and a display window attached to a peripheral edge of the window space and having an EMI protection layer formed around a peripheral edge of the display window.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Figure 1:
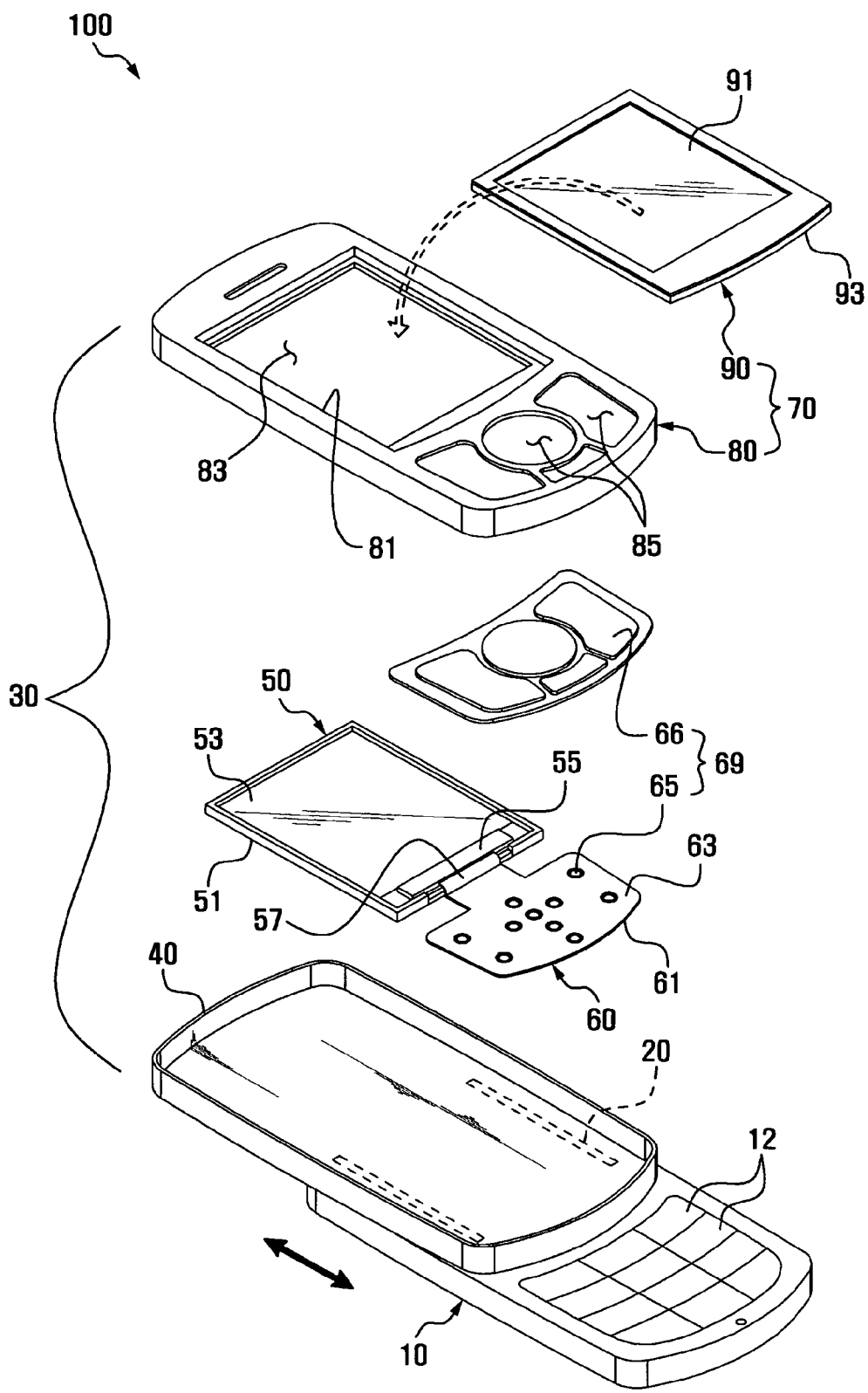
FIG. 1 is an exploded perspective view illustrating a mobile terminal according to an exemplary embodiment of the present invention.
Figure 2:
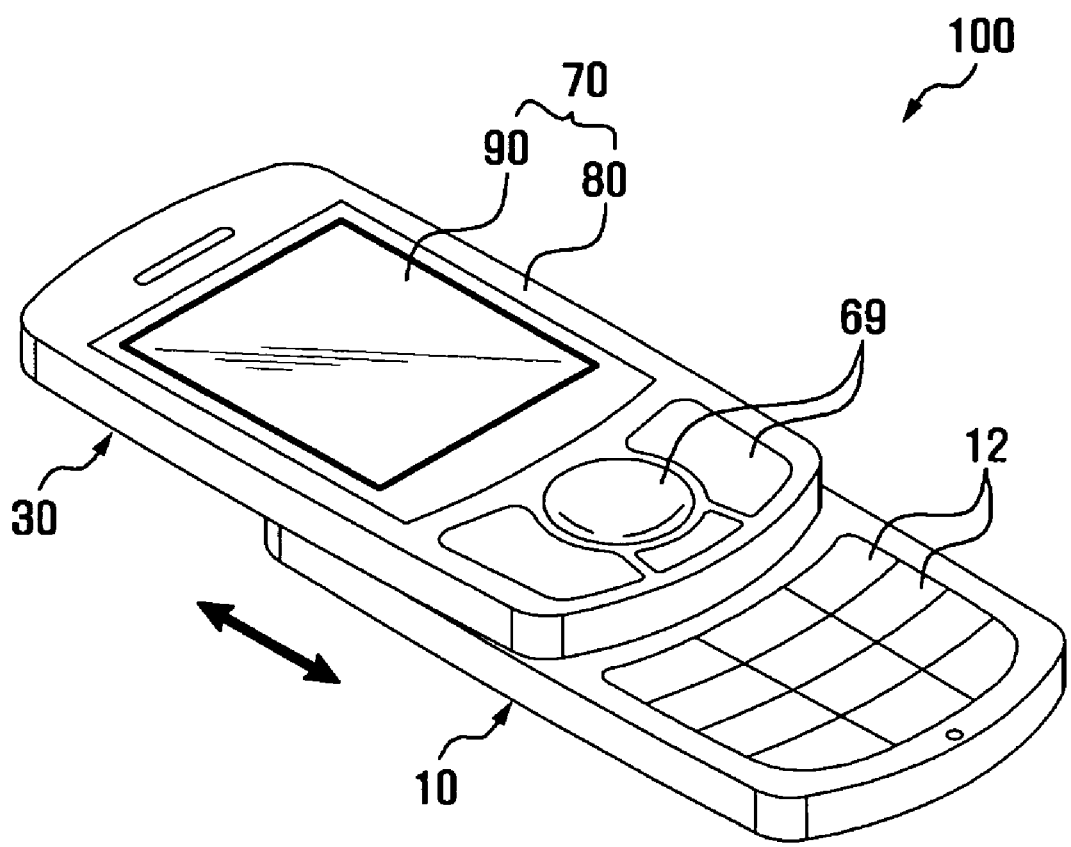
FIG. 2 is a perspective view illustrating an assembled state of the mobile terminal of FIG. 1.

FIG. 1 is an exploded perspective view illustrating a mobile terminal according to an exemplary embodiment of the present invention. FIG. 2 is a perspective view illustrating an assembled state of the mobile terminal of FIG. 1.

Referring to FIGS. 1 and 2, a mobile terminal 100 according to an exemplary embodiment of the present invention is a slide type mobile terminal and includes a first body 10 and a second body 30 that slides along the first body 10 through a sliding means 20.

A keypad 12 is disposed in a front surface of the first body 10 and is exposed to the outside by a sliding movement of the second body 30. Although not shown in the drawings, a main board including a microprocessor for controlling the entire operation of the mobile terminal 100 is installed within the first body 10, and an electrical signal input through the keypad 12 is transmitted to the main board.

The second body 30 includes a lower case 40, a display device 50, a direction key assembly 60, and an upper case 70. The display device 50 and the direction key assembly 60 are installed in an installation space formed between the lower case 40 and the upper case 70 upon assembling thereof. The lower case 40 is coupled to the front surface of the first body 10 through the sliding means 20. The display device 50 is installed within the lower case 40 such that a panel 53 of the display device 50 faces away from the front surface of the first body 10. The direction key assembly 60 is installed within the lower case 40 at an end of the lower case 40 adjacent to the keypad 12 of the first body 10 such that a direction key 69 of the direction key assembly 60 faces away from the front surface of the first body 10. The display device 50 and the direction key assembly 60 are electrically connected by a connection terminal (not shown) extending from the direction key assembly 60.

Figure 3:
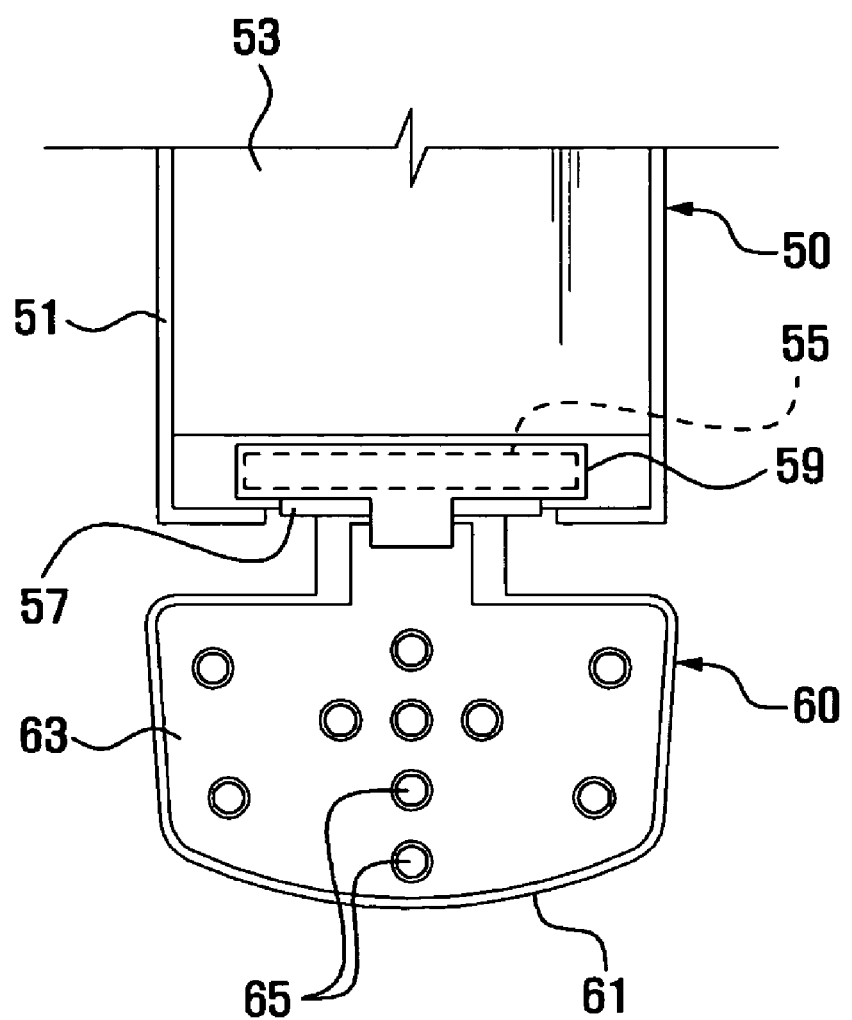
FIG. 3 is a plan view of a part of the mobile terminal of FIG. 1 illustrating a state in which an EMI tape is attached to a drive IC of the mobile terminal.
Figure 4:
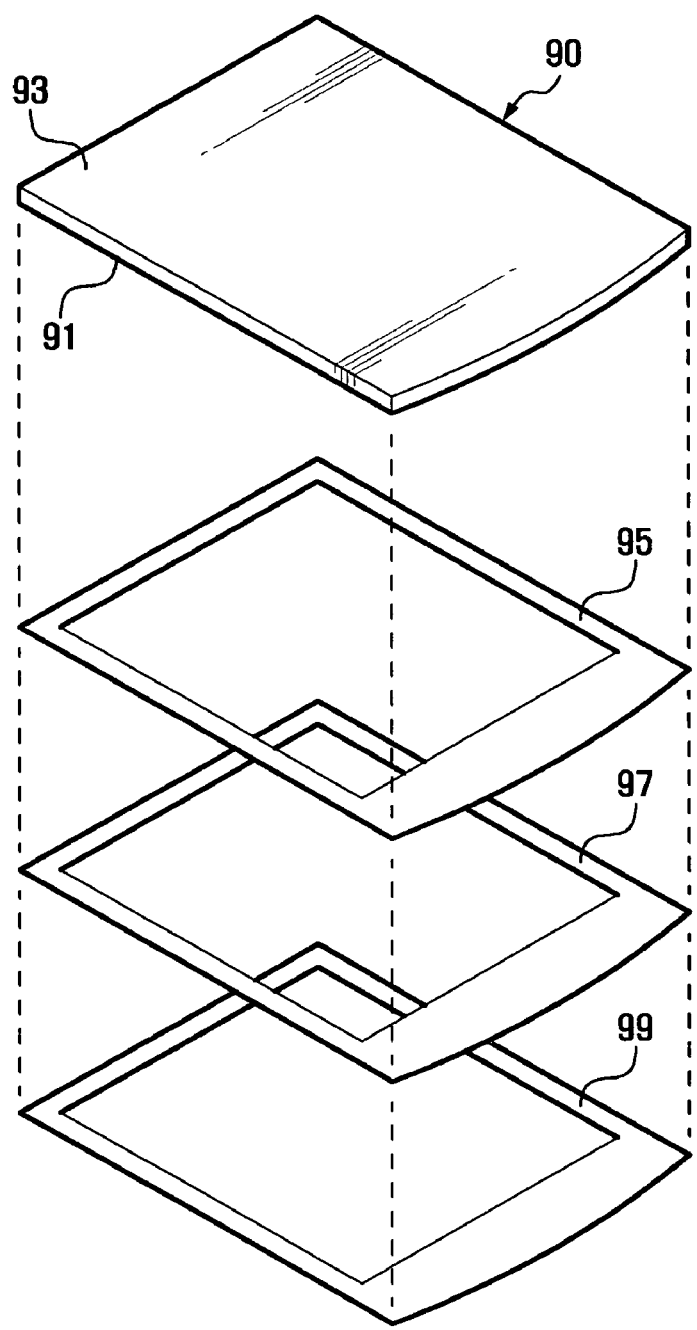
FIG. 4 is an exploded perspective view illustrating a display window of the mobile terminal of FIG. 1.
Figure 5:
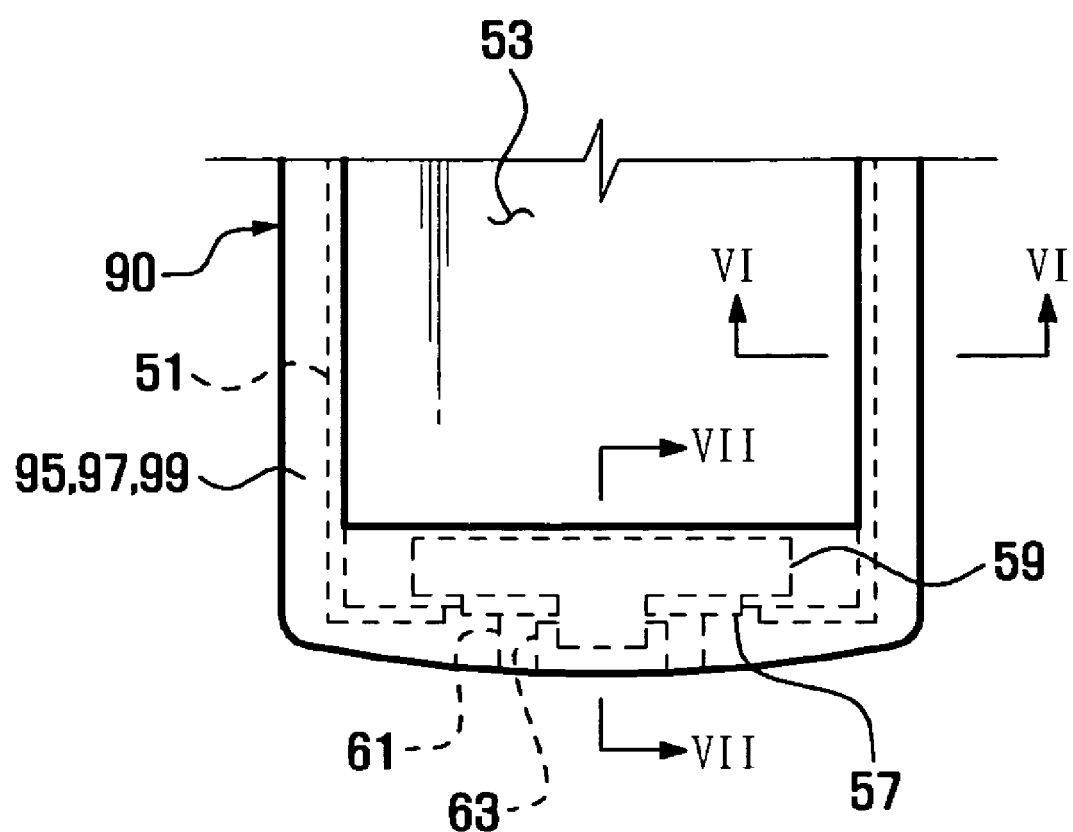
FIG. 5 is a plan view of a part of the mobile terminal of FIG. 1 illustrating a state in which a display device is positioned under the display window.
Figure 6:
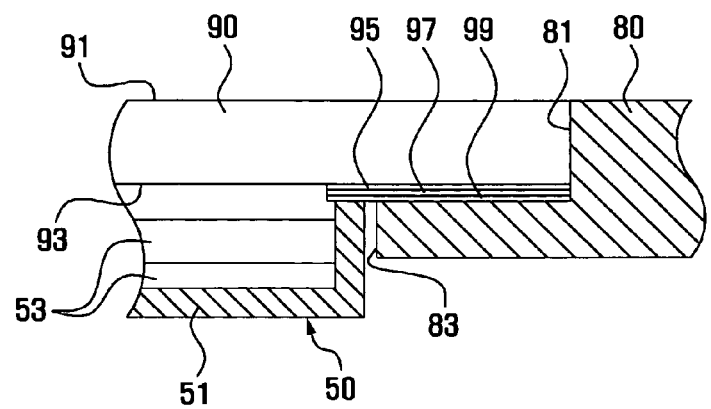
FIG. 6 is a cross-sectional view of the mobile terminal taken along line VI-VI of FIG. 5 illustrating a state in which an EMI protection layer of the display window contacts with a panel case.
Figure 7:
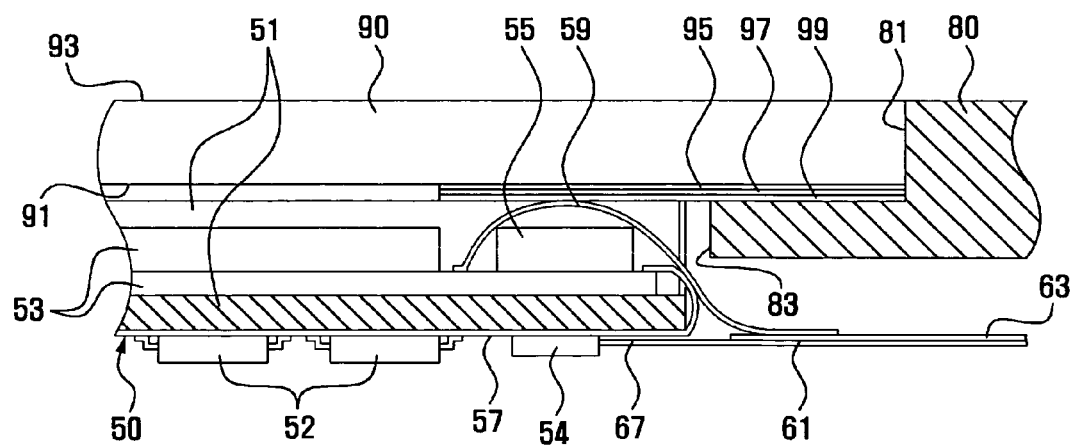
FIG. 7 is a cross-sectional view of the mobile terminal taken along line VII-VII of FIG. 5 illustrating a state in which an EMI protection layer of the display window contacts with an EMI tape.

FIG. 3 is a plan view of a part of the mobile terminal of FIG. 1 illustrating a state in which an EMI tape is attached to a drive IC of the mobile terminal. FIG. 4 is an exploded perspective view illustrating a display window of the mobile terminal of FIG. 1. FIG. 5 is a plan view of the mobile terminal 100 of FIG. 1 illustrating a state in which the display device 50 is positioned under the display window. FIG. 6 is a cross-sectional view of the mobile terminal 100 taken along line VI-VI of FIG. 5 illustrating a state in which an EMI protection layer of the display window contacts with a panel case. FIG. 7 is a cross-sectional view of the mobile terminal 100 taken along line VII-VII of FIG. 5 illustrating a state in which an EMI protection layer of the display window contacts with an EMI tape.

Referring to FIGS. 1 to 7, the display device 50 includes a panel case 51, a panel 53, a drive IC 55, and a tape wiring substrate 57. As the display device 50, a liquid crystal display (LCD) and an active matrix organic light emitting diode (AM OLED) may be used.

The panel 53 is provided within the panel case 51, and the drive IC 55 is mounted at one side of the panel 53. A wiring pattern exposed at one side of the tape wiring substrate 57 is connected to an electrode pad of the drive IC 55 and is mounted at one side of the panel 53 together with the drive IC 55. The remaining portion of the tape wiring substrate 57 is bent towards the rear side of the panel case 51 and is provided in the rear surface of the panel case 51. Electronic parts 52 for controlling the panel 53 through the drive IC 55 are mounted in the tape wiring substrate 57. Therefore, a signal input to the tape wiring substrate 57 is transmitted to the panel 53 through the drive IC 55, and a signal output from the panel 53 is transmitted to the tape wiring substrate 57 through the drive IC 55.

The panel case 51 may be made of plastic or metal, and when the panel case 51 is made of metal, the panel case 51 is grounded. For example, the panel case 51 is connected to a ground wire of the tape wiring substrate 57 and is grounded. The panel 53 is provided within the panel case 51 and may be positioned such that its upper surface is lower than an upper surface of the panel case 51.

In order to prevent application of static electricity to the drive IC 55, the drive IC 55 is covered with an EMI tape 59. The EMI tape 59 is connected to a ground layer 63 of the direction key assembly 60 to form a ground path for grounding static electricity. In order to prevent an electric potential of the drive IC 55 from falling to zero volts through the EMI tape 59, an insulating paper may be added between the drive IC 55 and the EMI tape 59. In FIG. 1, in order to show the drive IC 55, the EMI tape 59 is not shown.

The EMI tape 59 performs a function of reducing damage of the drive IC 55 due to static electricity and an abnormal operation of the drive IC 55 due to electromagnetic waves, and is formed by mixing silver (Ag) and nickel (Ni) within a tape made of plastic.

The direction key assembly 60 having the ground layer 63 is electrically connected to the tape wiring substrate 57 of the display device 50 to be installed in the lower case 40. The direction key assembly 60 has a structure in which a plurality of dome switches 65 forming the direction key 69 are disposed at a surface of a base film 61, and the ground layer 63 is formed on the surface of the base film 61 except at the positions at which the dome switches 65 are disposed. The direction key assembly 60 is connected to the tape wiring substrate 57 of the display device 50 through a connector 67 formed in a portion of the base film 61 protruding at one side thereof. For example, the connector 67 installed at one end of the base film 61 is coupled to a socket 54 formed in the tape wiring substrate 57 to electrically connect the direction key assembly 60 and the display device 50.

The direction key 69 includes a keypad 66 covering the dome switches 65, and the keypad 66 is exposed to the outside through holes 85 of the upper case 70.

The upper case 70 includes a case body 80 and a display window 90. A window space 83 for exposing the panel 53 of the display device 50 is formed in the case body 80. The display window 90 is attached to a peripheral edge of the window space 83 through an outer surface of the case body 80, and an EMI protection layer 99 is formed around a peripheral edge of the display window 90.

A recess 81 for inserting and installing the display window 90 is formed in the outer surface of the case body 80 around the periphery of the window space 83. The window space 83 has a size such that the entire panel case 51 is exposed. The case body 80 has a plurality of the holes 85 through which the direction key 69 of the direction key assembly 60 is exposed adjacent to an area in which the recess 81 is formed.

The display window 90 is made of an acryl material having an excellent light transmissivity and has a first surface 91 facing the panel 53 of the display device 50 and a second surface 93 opposite to the first surface 91. The EMI protection layer 99 is formed around a peripheral edge of at least one of the first surface 91 and the second surface 93. The present exemplary embodiment illustrates an example in which the EMI protection layer 99 is formed around the peripheral edge of the first surface 91 of the display window 90.

Particularly, the EMI protection layer 99 is formed at an outer edge of an area of the display window 90 in which the panel 53 of the display device 50 is exposed. Thereby, a part of the EMI protection layer 99 is exposed at the inside of the window space 83.

The EMI protection layer 99 may be formed by one of spray, sputtering, deposition, and attaching an EMI tape. The EMI protection layer 99 is made of a material including silver (Ag) and nickel (Ni). Because the first surface 91 and the second surface 93 of the display window 90 are flat surfaces having a little flexure, the EMI protection layer 99 may be formed in a uniform thickness at the first surface 91 of the display window 90.

A coated layer 95 is formed between the display window 90 and the EMI protection layer 99. The coated layer 95 is formed around a peripheral edge of the first surface 91 of the display window 90 in order to provide an enhanced external appearance of the mobile terminal 100. A logo or decoration, such as that of a mobile terminal manufacturer or a mobile communication provider, may be displayed in the coated layer 95. As a method of forming the coated layer 95, an electroless plating method may be used.

For stable bonding between the coated layer 95 and the EMI protection layer 99, a primer layer 97 is formed between the coated layer 95 and the EMI protection layer 99. The coated layer 95, the primer layer 97, and the EMI protection layer 99 are sequentially layered in the same area around a peripheral edge of the first surface 91 of the display window 90.

Particularly, when the upper case 70 is assembled in the lower case 40 in which the display device 50 and the direction key assembly 60 are installed, the EMI protection layer 99 contacts with the upper surfaces of both the panel case 51 and the EMI tape 59 as shown in FIGS. 5 to 7.

Therefore, because static electricity applied to the display window 90 is grounded by the ground layer 63 of the direction key assembly 60 via the EMI protection layer 99 and the EMI tape 59 contacting the EMI protection layer 99, damage to the drive IC 55 due to static electricity and damage of an external appearance of the display window 90 can be reduced. Particularly, because the EMI protection layer 99 formed in a uniform thickness around an entire peripheral edge of the flat display window 90 has a uniform resistance value, the EMI protection layer 99 can be effectively processed up to a high static electricity voltage.

When the panel case 51 is grounded with a metal material, because static electricity applied to the display window 90 can be grounded through the EMI protection layer 99 and the panel case 51 contacting the EMI protection layer 99, damage of the mobile terminal 100 due to static electricity can be reduced.

As described above, according to the present invention, because the EMI protection layer is formed around a peripheral edge of the display window of the case and the EMI protection layer is grounded, static electricity applied to the display window of the case can be grounded, and thus damage of a drive IC due to static electricity can be reduced.

Particularly, because the EMI protection layer formed in a uniform thickness around an entire peripheral edge of the flat display window has a uniform resistance value, the EMI protection layer can be effectively processed up to a high static electricity voltage.

Because the EMI protection layer is formed on a coated layer formed at an outer edge of the display window of the case and the EMI protection layer is grounded, generation of a black spot in the coated layer due to static electricity can be reduced.

By covering the drive IC with an EMI tape and grounding the EMI tape, damage of the drive IC due to static electricity can be more effectively reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A case of a mobile terminal for covering a display device thereof, comprising:
   a case body in which a window space for exposing a panel of the display device is formed; and
   a display window attached to a peripheral edge of the window space and having an electromagnetic interference (EMI) protection layer formed around a peripheral edge of the display window, the EMI protection layer separate from the case body.

2. The case of claim 1, wherein the EMI protection layer is formed at a peripheral edge of a display window area through which the panel of the display device is exposed.

3. The case of claim 2, wherein the display window has a first surface facing the panel of the display device and a second surface opposite to the first surface and exposed to the outside, and
   wherein the EMI protection layer is formed around a peripheral edge of at least one of the first surface and the second surface.

4. The case of claim 3, wherein the EMI protection layer is formed on the first surface around the peripheral edge of the first surface.

5. The case of claim 4, wherein the EMI protection layer comprises silver (Ag) and nickel (Ni).

6. The case of claim 5, wherein the EMI protection layer is formed using one of spray, sputtering, deposition, and attaching an EMI tape.

7. The case of claim 6, further comprising a coated layer formed between the display window and the EMI protection layer.

8. The case of claim 7, further comprising a primer layer formed between the coated layer and the EMI protection layer.

9. A mobile terminal comprising:
   a lower case;
   a display device provided within the lower case so that a panel of the display device faces outwards from the lower case; and
   an upper case coupled to the lower case to cover the display device, the upper case comprising a case body in which a window space for exposing a panel of the display device is formed, and a display window attached to a peripheral edge of the window space and having an EMI protection layer formed around a peripheral edge of the display window, the EMI protection layer separate from the upper case.

10. The mobile terminal of claim 9, wherein the EMI protection layer is formed at a peripheral edge of a display window area through which the panel of the display device is exposed.

11. The mobile terminal of claim 10, wherein the display window has a first surface facing the panel of the display device and a second surface opposite to the first surface and exposed to the outside, and
   the EMI protection layer is formed around a peripheral edge of at least one of the first surface and the second surface.

12. The mobile terminal of claim 11, wherein the EMI protection layer is formed on the first surface around the peripheral edge of the first surface.

13. The mobile terminal of claim 12, wherein the EMI protection layer comprises silver (Ag) and nickel (Ni).

14. The mobile terminal of claim 13, wherein the EMI protection layer is formed using one of spray, sputtering, deposition, and attaching an EMI tape.

15. The mobile terminal of claim 14, wherein the upper case further comprises a coated layer formed between the display window and the EMI protection layer.

16. The mobile terminal of claim 15, wherein the upper case further comprises a primer layer formed between the coated layer and the EMI protection layer.

17. The mobile terminal of claim 16, further comprising a direction key assembly connected to the display device provided in the lower case and having a ground layer, wherein a hole for exposing a direction key of the direction key assembly is formed in the upper case.

18. The mobile terminal of claim 17, wherein the display device further comprises:
- a panel case within which the panel case is installed;
- a drive integrated circuit (IC) provided at one side of the panel; and
- an EMI tape covering the drive integrated circuit and connected to the ground layer of the direction key assembly.

19. The mobile terminal of claim 18, wherein the EMI protection layer contacts with the EMI tape.

20. The mobile terminal of claim 19, wherein the panel case is grounded, and the EMI protection layer contacts with the panel case.

* * * * *

UNITED STATES PATENT AND TRADEMARK OFFICE
CERTIFICATE OF CORRECTION

| | | |
|---|---|---|
| PATENT NO. | : 8,285,335 B2 | Page 1 of 1 |
| APPLICATION NO. | : 12/316841 | |
| DATED | : October 9, 2012 | |
| INVENTOR(S) | : Seo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this
Twenty-third Day of September, 2014

Michelle K. Lee
*Deputy Director of the United States Patent and Trademark Office*